US00RE50304E

(19) United States
(12) Reissued Patent
Sterling

(10) Patent Number: US RE50,304 E
(45) Date of Reissued Patent: Feb. 18, 2025

(54) METHOD AND APPARATUS FOR IMPLEMENTING A DATA BOOK APPLICATION MODULE

(71) Applicant: JPMorgan Chase Bank, N.A., New York, NY (US)

(72) Inventor: Susan Sterling, Syosset, NY (US)

(73) Assignee: JPMORGAN CHASE BANK, N.A., New York, NY (US)

(21) Appl. No.: 18/077,584

(22) Filed: Dec. 8, 2022

Related U.S. Patent Documents

Reissue of:
(64) Patent No.: 11,281,636
Issued: Mar. 22, 2022
Appl. No.: 16/864,552
Filed: May 1, 2020

(51) Int. Cl.
*G06F 16/21* (2019.01)
*G06F 16/16* (2019.01)
*G06F 16/22* (2019.01)
*G06F 16/28* (2019.01)
*G06F 16/955* (2019.01)

(52) U.S. Cl.
CPC ..... *G06F 16/211* (2019.01); *G06F 16/168* (2019.01); *G06F 16/221* (2019.01); *G06F 16/2282* (2019.01); *G06F 16/283* (2019.01); *G06F 16/955* (2019.01)

(58) Field of Classification Search
CPC .... G06F 16/168; G06F 16/211; G06F 16/221; G06F 16/283; G06F 16/955; G06F 16/2282
See application file for complete search history.

(56) References Cited

U.S. PATENT DOCUMENTS 7,822,769 B2 * 10/2010 Rohan ..... G06Q 90/00
10,204,380 B1 * 2/2019 Moore ..... G06F 16/353
2013/0046582 A1 * 2/2013 Ramer ..... G06Q 30/0271 705/7.32

* cited by examiner

*Primary Examiner* — Joshua D Campbell
(74) *Attorney, Agent, or Firm* — GREENBLUM & BERNSTEIN, P.L.C.

(57) ABSTRACT

Various methods, apparatuses/systems, and media for implementing a data book application module is disclosed. The processor identifies an application that needs to be scanned through a data factory; receives inventories of all servers and databases associated with the data factory; scans the servers and databases for receiving inventories of schema, tables and columns associated with the application; and applies artificial intelligence (AI) and/or machine learning (ML) routines and matching algorithms for matching contents of columns to predefined logical terms. The processor also converts the contents of columns into taxonomies associated with the predefined logical terms; matches the taxonomies with the corresponding predefined logical terms; assigns a probability of accuracy value to the matched terms; and populates a data catalog with the matched terms when the assigned probability of accuracy value satisfies a predetermined threshold value.

20 Claims, 13 Drawing Sheets

600a

600b

600c

600d

600e

600f

600g

METHOD AND APPARATUS FOR IMPLEMENTING A DATA BOOK APPLICATION MODULE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

This disclosure generally relates to data processing, and, more particularly, to methods and apparatuses for implementing a data book application module for data management, including data lineage, data usage, and data analysis.

BACKGROUND

In general, large enterprises, corporations, agencies, institutions, and other organizations are facing a continuing problem of handling, processing, and/or determining sources of a vast amount of data received due to mergers and acquisitions in a quick and expedited manner. Such mergers and acquisitions often result in merging a vast number of applications and databases and storing data relating to those applications and databases electronically. The stored data that need to be analyzed by a variety of persons within the organization to determine where particular data may be located and who may be using them may prove to be extremely time consuming, confusing, and inefficient as the data being tracked increases and as organizations implement more specialized or distributed functions due to mergers and acquisitions.

In addition, many enterprises, especially banks, may be under increasing regulatory scrutiny, and this may include being able to substantiate data found on regulatory reports. It may be necessary to be able to trace data lineage from report content, back through applications acting as Authoritative Data Sources (ADS), back to the System of Record (SOR). For example, when building new applications, it may be necessary to be able to identify appropriate authoritative sources of data. When making change, or decommissioning old applications, it may be necessary to be able to identify all upstream and downstream impacts this would cause. All of the above may require that there may be metadata recorded or captured that describes the data present in nodes/applications and flowing between them. It may also require that the metadata may be appropriately expressive and detailed, so that it doesn't just describe the "type" of the data, it also describes the "subset" of that type which might be involved in a particular deployment of the application, in a particular location, subject to particular constraints, etc. The harvesting of metadata describing data present and flowing may likely to include a mixture of automatic and manual capture, which may prove to be highly error prone.

SUMMARY

The present disclosure, through one or more of its various aspects, embodiments, and/or specific features or sub-components, may provide, among others, various systems, servers, devices, methods, media, programs, and platforms for implementing a data book application module for data management, including data lineage, data usage, and data analysis, thereby gaining a high degree of confidence in the metadata recorded and automatically detecting and resolving data quality and data lineage issues in an efficient manner, but the disclosure is not limited thereto.

According to an aspect of the present disclosure, a method for implementing a data book application module by utilizing one or more processors and one or more memories is disclosed. The method may include: providing a data factory that includes a data book application; identifying an application that needs to be scanned through the data factory utilizing the data book application; receiving inventories of all servers and databases associated with the data factory; scanning the servers and databases for receiving inventories of schema associated with the application, the schema containing tables and the tables containing columns; applying artificial intelligence and/or machine learning routines and matching algorithms for matching contents of columns to predefined logical terms; converting the contents of columns into taxonomies associated with the predefined logical terms; matching the taxonomies with the corresponding predefined logical terms; assigning a probability of accuracy value to the matched terms; and populating a data catalog with the matched terms when the assigned probability of accuracy value satisfies a predetermined threshold value.

According to another aspect of the present disclosure, the method may further include: receiving a user input via a first icon of a user interface, the first icon corresponding to a glossary icon that allows access to a glossary stored onto the servers and databases, wherein the glossary establishes common terminology across different applications and groups within an organization; and executing a search to scan the servers and databases for receiving inventories of columns, tables, and schema associated with the application from the glossary.

According to yet another aspect of the present disclosure, the method may further include: receiving a user input via a second icon of a user interface, the second icon corresponding to a catalog icon that allows access to a catalog stored onto the servers and databases, the catalog containing a listing of some or all applications within an organization identifying which lines of business use or be responsible for an application; and scanning the servers and databases for receiving inventories of columns, tables, and schema associated with the application from the catalog.

According to further aspect of the present disclosure, the method may further include: running the data book application at log in; and maintaining to run the data book application in the background after log in.

According to yet another aspect of the present disclosure, the method may further include: running the data book application from any application on a Windows desktop.

According to an additional aspect of the present disclosure, the method may further include: receiving a single keystroke to provide a dialog box where a user can type and select a predefined type of search.

According to yet another aspect of the present disclosure, the method may further include: receiving a user input to select a desired web browser to view search results.

According to a further aspect of the present disclosure, the method may further include: applying a version 4 (V4) globally unique identifier (GUID) mechanism to assign an asset identifier (ID); and scanning the servers and databases for obtaining inventories of columns for that asset ID within the data factory.

According to a further aspect of the present disclosure, the method may further include: receiving a user input to change search uniform resource locator (URL) to perform target searches.

According to another aspect of the present disclosure, a system for implementing a data book application module is disclosed. The system may include a data factory that includes a data book application, and a processor that is coupled to the data factory via a communication network. The processor may be configured to: identify an application that needs to be scanned through the data factory utilizing the data book application; receive inventories of all servers and databases associated with the data factory, scan the servers and databases for receiving inventories of schema associated with the application, the schema containing tables and the tables containing columns; apply artificial intelligence and/or machine learning routines and matching algorithms for matching contents of columns to predefined logical terms; convert the contents of columns into taxonomies associated with the predefined logical terms; match the taxonomies with the corresponding predefined logical terms; assign a probability of accuracy value to the matched terms; and populate a data catalog with the matched terms when the assigned probability of accuracy value satisfies a predetermined threshold value.

According to yet another aspect of the present disclosure, the processor may be further configured to: receive a user input via a first icon of a user interface, the first icon corresponding to a glossary icon that allows access to a glossary stored onto the servers and databases, wherein the glossary establishes common terminology across different applications and groups within an organization; and execute a search to scan the servers and databases for receiving inventories of columns, tables, and schema associated with the application from the glossary.

According to another aspect of the present disclosure, the processor may be further configured to: receive a user input via a second icon of a user interface, the second icon corresponding to a catalog icon that allows access to a catalog stored onto the servers and databases, the catalog containing a listing of some or all applications within an organization identifying which lines of business use or be responsible for an application; and scan the servers and databases for receiving inventories of columns, tables, and schema associated with the application from the catalog.

According to a further aspect of the present disclosure, the processor may be further configured to: run the data book application at log in; and maintain running of the data book application in the background after log in.

According to a further aspect of the present disclosure, the processor may be further configured to: run the data book application from any application on a Windows desktop.

According to a further aspect of the present disclosure, the processor may be further configured to: receive a single keystroke to provide a dialog box where a user can type and select a predefined type of search.

According to a further aspect of the present disclosure, the processor may be further configured to: apply a version 4 (V4) globally unique identifier (GUID) mechanism to assign an asset identifier (ID); and scan the servers and databases for obtaining inventories of columns for that asset ID within the data factory.

According to a further aspect of the present disclosure, the processor may be further configured to: receive a user input to change search uniform resource locator (URL) to perform target searches.

According to another aspect of the present disclosure, a non-transitory computer readable medium configured to store instructions for implementing a data book application module is disclosed. The instructions, when executed, may cause a processor to perform the following: accessing a data factory that includes a data book application; identifying an application that needs to be scanned through the data factory utilizing the data book application; receiving inventories of all servers and databases associated with the data factory, scanning the servers and databases for receiving inventories of schema associated with the application, the schema containing tables and the tables containing columns; applying artificial intelligence and/or machine learning routines and matching algorithms for matching contents of columns to predefined logical terms; converting the contents of columns into taxonomies associated with the predefined logical terms; matching the taxonomies with the corresponding predefined logical terms; assigning a probability of accuracy value to the matched terms; populating a data catalog with the matched terms when the assigned probability of accuracy value satisfies a predetermined threshold value.

According to yet another aspect of the present disclosure, the instructions, when executed, may further cause the processor to perform the following: receiving a user input via a first icon of a user interface, the first icon corresponding to a glossary icon that allows access to a glossary stored onto the servers and databases, wherein the glossary establishes common terminology across different applications and groups within an organization; and executing a search to scan the servers and databases for receiving inventories of columns, tables, and schema associated with the application from the glossary.

According to another aspect of the present disclosure, the instructions, when executed, may further cause the processor to apply intersection, union, and difference operations between cube sets to generate a single cube set.

According to a further aspect of the present disclosure, the instructions, when executed, may further cause the processor to perform the following: receiving a user input via a second icon of a user interface, the second icon corresponding to a catalog icon that allows access to a catalog stored onto the servers and databases, the catalog containing a listing of some or all applications within an organization identifying which lines of business use or be responsible for an application; and scanning the servers and databases for receiving inventories of columns, tables, and schema associated with the application from the catalog.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
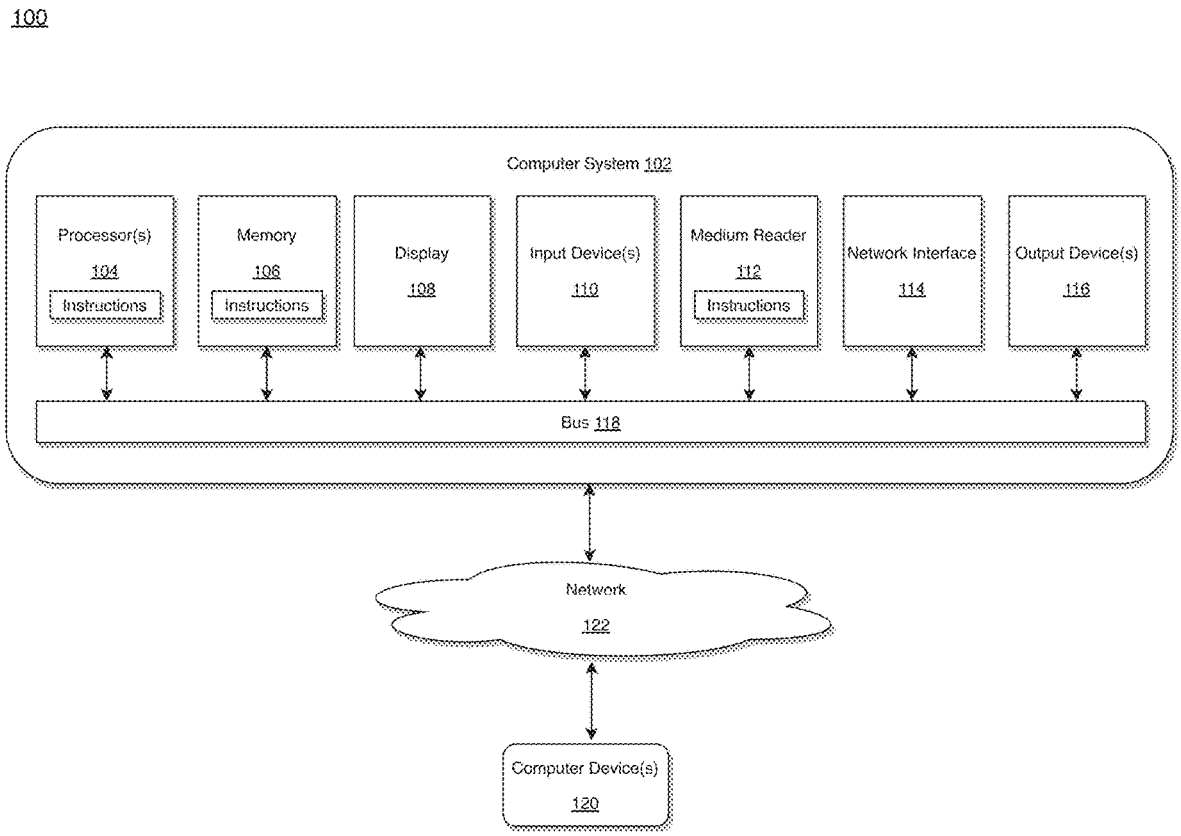
FIG. 1 illustrates a computer system for implementing a data book application device in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, devices and/or modules. Those skilled in the art will appreciate that these blocks, units, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, devices, and/or modules being implemented by microprocessors or similar, they may be programmed using software (e.g., microcode) to perform various functions discussed herein and may optionally be driven by firmware and/or software. Alternatively, each block, unit, device, and/or module may be implemented by dedicated hardware, or as a combination of dedicated hardware to perform some functions and a processor (e.g., one or more programmed microprocessors and associated circuitry) to perform other functions. Also, each block, unit, device, and/or module of the example embodiments may be physically separated into two or more interacting and discrete blocks, units, devices, and/or modules without departing from the scope of the inventive concepts. Further, the blocks, units, devices, and/or modules of the example embodiments may be physically combined into more complex blocks, units, devices, and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized processes for implementing a data book application module (may also be referred to as data book anywhere application) for data management, including data lineage, data usage, and data analysis, thereby gaining a high degree of confidence in the metadata recorded and automatically detecting and resolving data quality and data lineage issues in an efficient manner, but the disclosure is not limited thereto.

Figure 2:
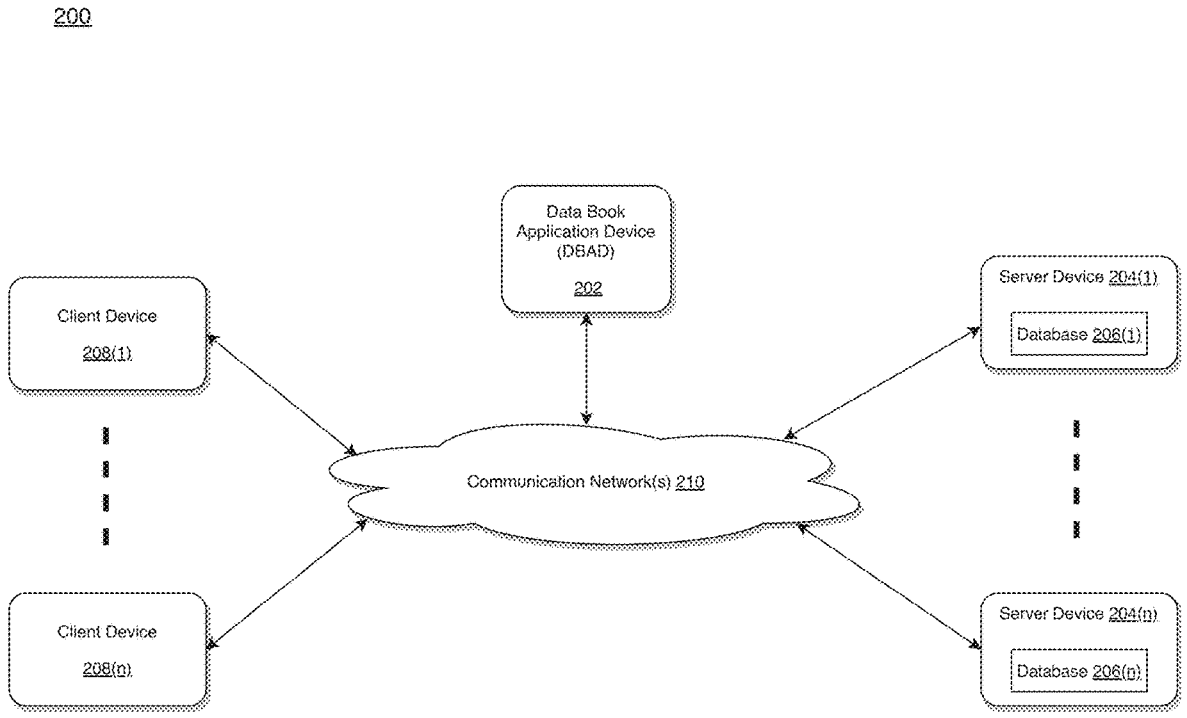
FIG. 2 illustrates an exemplary diagram of a network environment with a data book application device in accordance with an exemplary embodiment.

Referring to FIG. 2, a schematic of an exemplary network environment 200 for implementing a data book application device (DBAD) of the instant disclosure is illustrated.

Conventional system, that does not implement a DBAD of the instant disclosure, may not be able to handle and process a vast amount of data in a quick and expedited manner. For example, conventional data processing system that does not implement an DBAD of the instant disclosure may neither identify appropriate authoritative sources of data when building new applications, nor identify all upstream and downstream impacts this would cause when making change, or decommissioning old applications. In addition, conventional data processing system that does not implement an DBAD of the instant disclosure, may not be configured to detect and resolve data quality issues and data lineage issues with a high degree of confidence that the metadata recorded is accurate.

According to exemplary embodiments, the above-described problems associated with conventional system may be overcome by implementing a DBAD 202 having a data book application module as illustrated in FIG. 2 by automatically generating data lineage accurately, thereby automatically detecting and resolving data quality issues and data lineage issues, and thus gaining a high degree of confidence in the metadata recorded, but the disclosure is not limited thereto.

The DBAD 202 may be the same or similar to the computer system 102 as described with respect to FIG. 1.

The DBAD 202 may store one or more applications that can include executable instructions that, when executed by the DBAD 202, cause the DBAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DBAD 202 itself, may be located in virtual server(s) running in a cloud-based computing environment rather than being tied to one or more specific physical network computing devices. Also, the application(s) may be running in one or more virtual machines (VMs) executing on the DBAD 202. Additionally, in one or more embodiments of this technology, virtual machine(s) running on the DBAD 202 may be managed or supervised by a hypervisor.

In the network environment 200 of FIG. 2, the DBAD 202 is coupled to a plurality of server devices 204(1)-204(n) that hosts a plurality of databases 206(1)-206(n), and also to a plurality of client devices 208(1)-208(n) via communication network(s) 210. A communication interface of the DBAD 202, such as the network interface 114 of the computer system 102 of FIG. 1, operatively couples and communicates between the DBAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DBAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DBAD 202 may be a standalone device or integrated with one or more other devices or apparatuses, such as one or more of the server devices 204(1)-204(n), for example. In one particular example, the DBAD 202 may be hosted by one of the server devices 204(1)-204(n), and other arrangements are also possible. Moreover, one or more of the devices of the DBAD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DBAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DBAD 202 that may be configured for utilizing tools and packages in conjunction with open source to read physical data, map the information (e.g., metadata from the physical data), and assign business terminology for calculating and testing of data location and flow statements, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the DBAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DBAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DBAD 202, the server devices 204(1)-204(n), or the client devices 208(1)-208(n), for example, may be configured to operate as virtual instances on the same physical machine. For example, one or more of the DBAD 202, the server devices 204(1)-204(n), or the client devices 208(1)-208(n) may operate on the same physical device rather than as separate devices communicating through communication network(s) 210. Additionally, there may be more or fewer DBADs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
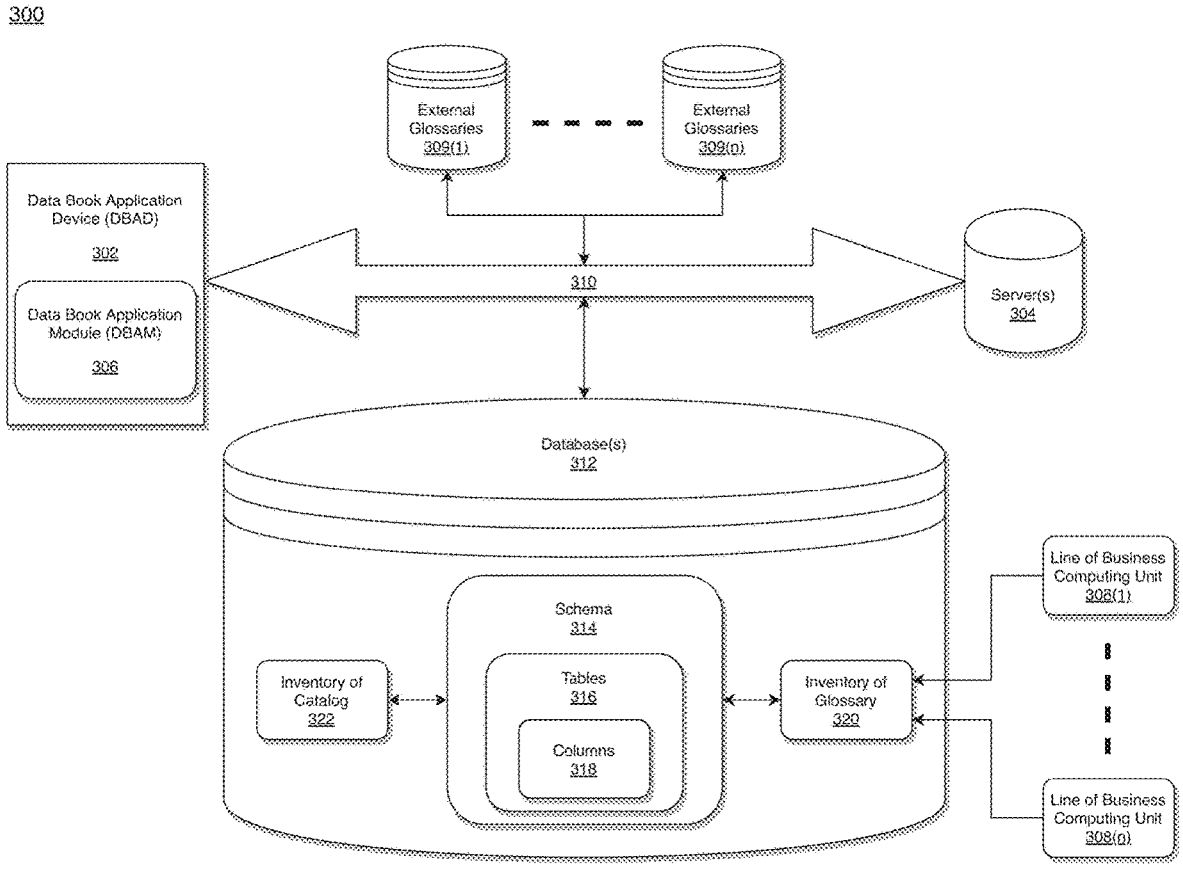
FIG. 3 illustrates a system diagram for implementing a data book application device with a data book application module in accordance with an exemplary embodiment.

FIG. 3 illustrates a system diagram for implementing a DBAD with a data book application module (DBAM) in accordance with an exemplary embodiment.

As illustrated in FIG. 3, in the system 300, according to exemplary embodiments, the DBAD 302 including the DBAM 306 may be connected to a plurality of servers 304, a plurality of databases 312, a plurality of line of business computing units 308(1)-308(n), and a plurality of external glossaries 309(1)-309(n) via a communication network 310, but the disclosure is not limited thereto. For example, according to exemplary embodiments, the DBAM 306 may be connected to any desired database besides database 312. According to exemplary embodiments, the database 312 may be configured to store schema 314 associated with an application. The schema may contain tables 316, and each table 316 may contain columns 318.

According to exemplary embodiments, the database 312 may also contain inventories of catalog 322 utilized by one or more organizations and inventories of glossaries (i.e., business glossaries utilized by one or more organizations that include logical terms to help run their business activities by utilizing various applications).

According to exemplary embodiments, the implementation of a DBAD with a data book application module (DBAM) may provide data management architectures and the integration and reporting on metadata within an organization, including the organization's domains (e.g., lines of business, departments, technologies, etc.). For example, the inventory of glossary 320 may be configured to receive data (e.g., logical business terms) from corresponding lines of business computing units 308(1)-308(n).

According to exemplary embodiments, the DBAD 302 may also receive data from external glossaries 309(1)-309(n). In one exemplary embodiment, graph databases and semantic search technologies may be used to enable the incorporation of a wide array of data sources as well as flexible, intuitive user interfaces.

According to exemplary embodiments, the DBAM 306 within the DBAD 302 may be configured to access the database 312 that contains schema 314, the schema containing tables 316, and the tables containing columns 318. Data may flow between the schema 314 and the inventory of catalog 322 and between the schema 314 and the inventory of glossary 320, but the disclosure is not limited thereto.

For example, according to exemplary embodiments, the DBAM 306 may be configured to obtain all columns 318 associated with a particular application and store them into an inventory and then apply artificial intelligence (M) machine learning (ML) routines and matching algorithms for matching the columns to Englishify terms. One of ordinary skill the art would readily recognize that any desired known AI ML routines and matching algorithms may be utilized by the DBAM 306 to obtain an optimal matching result. When the DBAM 306 returns a search result for a term ACCT_NM, it converts that term to an English term "account number." The DBAM 306 then scans the inventory of glossary 320 of an organization and generates a match, thereby updates the columns 318 with the content of the columns (e.g., ACCT_NM) and a logical definition of what that column is (e.g., account number). According to exemplary embodiments, the DBAM 306 may scan metadata of the data received from the line of business computing units 308(1)-308(n) to generate/update the inventory of glossary 320.

According to exemplary embodiments, the DBAM 306 may be configured to map the column to the Englishified terms and then map the terms to corresponding proposed logical business terms and then assign a coefficient or a probability of accuracy to each term. The DBAM 306 may be configured to match the coefficient of probability to an application. The DBAM 306 may be configured to populate a data catalog with the matched terms when the assigned probability of accuracy value of each term satisfies a predetermined threshold value.

The logical business terms may be received from the plurality of line of business computing units 308(1)-308(n). According to exemplary embodiments, these logical business terms may be generated by an organization for their own list of terms for their own glossaries to do business as well as all external glossaries 309(1)-309(n) that are available as inputs that are in public domain in order to assist in better matching. For example, the DBAM 306 may be configured to incorporate Bloomberg financial glossary, American Banker glossary or any other open source glossary that are available in public domain that would help in better matching. For example, by scanning an application, the DBAM 306 outputs that checking account is matched to an account number, then the DBAM 306 updates the column 318 within the table 316 include a term called Checking Account Number which may match other terms during further scanning. Thus, as the contents get approved and gets better, the matching gets better.

According to exemplary embodiments, data within an organization may be linked to create a single unified view of an organization's domains, which may be used to support data-driven decision making. Exemplary embodiments may assist in understanding the root cause of data quality issues, in understanding how technology processes and stores the data used by the organization to improve the cost effectiveness of the organization's technical solutions, in understanding how technology processes and stores the data used by the organization to minimize the organization's exposure to financial or reputational loss as a result of a loss of data or breach of data confidentiality, etc.

For example, exemplary embodiments may provide answers to some or all of the following: (1) what organizational applications, user tools, etc., feed certain reports; (2) what organization applications subscribe to other applications; (3) where does certain data get used; (4) where are critical data elements stored physically across the organization; (5) what is the data quality of the physical instances (e.g., in Systems of Record (SOR)) of critical data elements; (6) are the applications that are SORs for my critical data elements compliant with organizational data management standards; (7) are any report cells being sourced from a decommissioned system; (8) are there report cells that share a Micro Data Reference Manual (MDRM) Identifier sourced from the same fields/systems/domains; (9) for report cells linked to critical data elements, are source systems listed as Authoritative Data Sources (ADS) or SORs; (10) what Data Quality (DQ) issues are related to the specific reports/schedules/systems required for a financial firm's regulatory compliance; etc.

According to exemplary embodiment, the DBAD 302 is described and shown in FIG. 3 as including the DBAM 306, although it may include other rules, policies, modules, databases, or applications, for example.

According to exemplary embodiments, the server 304 may be the same or equivalent to the server device 204 as illustrated in FIG. 2.

The process may be executed via the communication network 310, which may comprise plural networks as described above. For example, in an exemplary embodiment, either or all of the external glossaries 309(1)-309(n) (i.e., external databases), databases 312, servers 304 and the line of business computing units 308(1)-308(n) may communicate with the DBAD 302 via broadband or cellular communication. Of course, these embodiments are merely exemplary and are not limiting or exhaustive.

Figure 4:
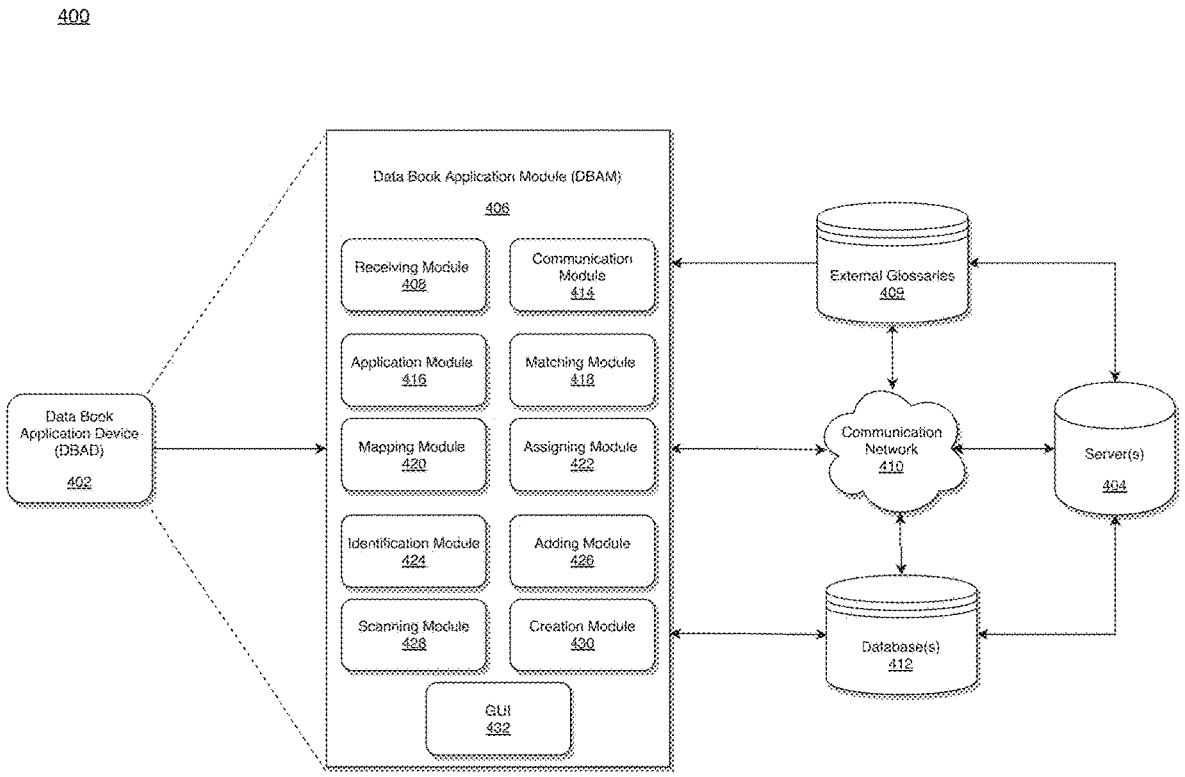
FIG. 4 illustrates a system diagram for implementing data book application module of FIG. 3 in accordance with an exemplary embodiment.

FIG. 4 illustrates a system diagram for implementing data book application module of FIG. 3 in accordance with an exemplary embodiment. As illustrated in FIG. 4, the system 400 may include a DBAD 402 within which a DBAM 406 may be embedded, databases 412, servers 404, external glossaries 409, and a communication network 410.

As illustrated in FIG. 4, the DBAM 406 may include a receiving module 408, a communication module 414, an application module 416, a matching module 418, a mapping module 420, an assigning module 422, an identification module 424, an adding module 426, a scanning module 428, a creation module 430, and a graphical user interface (GUI) 432. According to exemplary embodiments, the databases 412 may be external to the DBAD 402 and the DBAD 402 may include various systems that are managed and operated by an organization. The databases 412 may be the same or similar to the databases 312 as illustrated in FIG. 3. Thus, the databases 412 may also contain schema which may contain tables which may contain columns associated with one or more applications. Further, the databases 412 may also contain inventories of catalog and inventories of glossaries of one or more organizations and the inventories of glossaries may obtain data and/or metadata from various line of business computing units. The external glossaries may be the same or similar to the external glossaries 309(1)-309(n) as illustrated in FIG. 3.

The process may be executed via the communication network 410, which may comprise plural networks as described above. For example, in an exemplary embodiment, the various components of the DBAM 406 may communicate with the servers 404, the external glossaries 409, and the databases 412 via the communication module 414 and the communication network 410. Of course, these embodiments are merely exemplary and are not limiting or exhaustive.

According to exemplary embodiments, the communication module 424 may be configured to establish a link between the databases 412, servers 404, and the external glossaries 409 via the communication network 410.

According to exemplary embodiments, each of the receiving module 408, the communication module 414, the application module 416, the matching module 418, the mapping module 420, the assigning module 422, the identification module 424, the adding module 426, the scanning module 428, the creation module 430 may be implemented by microprocessors or similar, they may be programmed using software (e.g., microcode) to perform various functions discussed herein. Alternatively, each of the receiving module 408, the communication module 414, the application module 416, the matching module 418, the mapping module 420, the assigning module 422, the identification module 424, the adding module 426, the scanning module 428, the creation module 430 may be implemented by dedicated hardware, or as a combination of dedicated hardware to perform some functions and a processor (e.g., one or more programmed microprocessors and associated circuitry) to perform various functions discussed herein as well as other functions. Also, according to exemplary embodiments, each of the receiving module 408, the communication module 414, the application module 416, the matching module 418, the mapping module 420, the assigning module 422, the identification module 424, the adding module 426, the scanning module 428, the creation module 430 may be physically separated into two or more interacting and discrete blocks, units, devices, and/or modules without departing from the scope of the inventive concepts.

According to exemplary embodiments, data may be registered when first introduced into the organization, and may be loaded from lines of business computing units, external sources, etc. The data registration may record the metadata of incoming reservoir sources data by conforming to a model. This model may define, for example, the type of data that will be received, what meaning the data has to the organization, and what standard the data should follow.

According to exemplary embodiments, lines of business may be subunits within an organization. In one embodiment, the relationship between one or more of lines of business may be based on an organizational chart, etc.

Application catalog may maintain a listing of some or all applications within an organization. In one embodiment, application catalog may identify which lines of business may use or be responsible for an application.

According to exemplary embodiments, the system 400 for implementing DBAM 406 may include a data factory (i.e., databases) that includes a data book application. According to exemplary embodiments, the identification module 424 may be configured to identify an application that needs to be scanned through the data factory utilizing the data book application. The receiving module 406 may be configured to receive inventories of all servers and databases associated with the data factory and the scanning module 428 may be configured to scan the servers and databases for receiving inventories of schema associated with the application, the schema containing tables and the tables containing columns.

According to exemplary embodiments, the application module 416 may be configured to apply artificial intelligence and/or machine learning routines and matching algorithms for matching contents of columns to predefined logical terms and the creation module 430 may be configured to convert the contents of columns into taxonomies associated with the predefined logical terms.

The DBAM 406 may be configured to receive metadata from organizational metadata repository, which may include a glossary of critical data elements, a Logical Data Model (LDM), a message schema, etc. According to exemplary embodiments, these elements may be defined by the organization. In another embodiment, machine learning may be used to update the glossary and models as is necessary and/or desired. For example, a "Country" message filed "country Id" may be traced to an LDM that defines a "Country" data entity and its each attribute has a lineage to a critical data element (CDE) "Country Code" defined in a business glossary. In this context, an LDM represents the organization's data as it is understood by the business. A business glossary may establish common terminology across different applications and groups within the organization.

According to exemplary embodiments, the DBAM 406 may be configured to employ machine learning and/or artificial intelligence to identify potential data exposures and matching columns within tables of a schema to logical terms. In one embodiment, the DBAM 406 may continuously monitor data throughout an organization in real-time.

According to exemplary embodiments, the matching module 418 may be configured to match the taxonomies (e.g., Englishify terms) with the corresponding predefined logical terms (e.g., proposed business terms) and the assigning module 422 may be configured to assign a probability of accuracy value to the matched terms. The adding module 426 may be configured to populate a data catalog with the matched terms when the assigned probability of accuracy value satisfies a predetermined threshold value.

Figure 5:
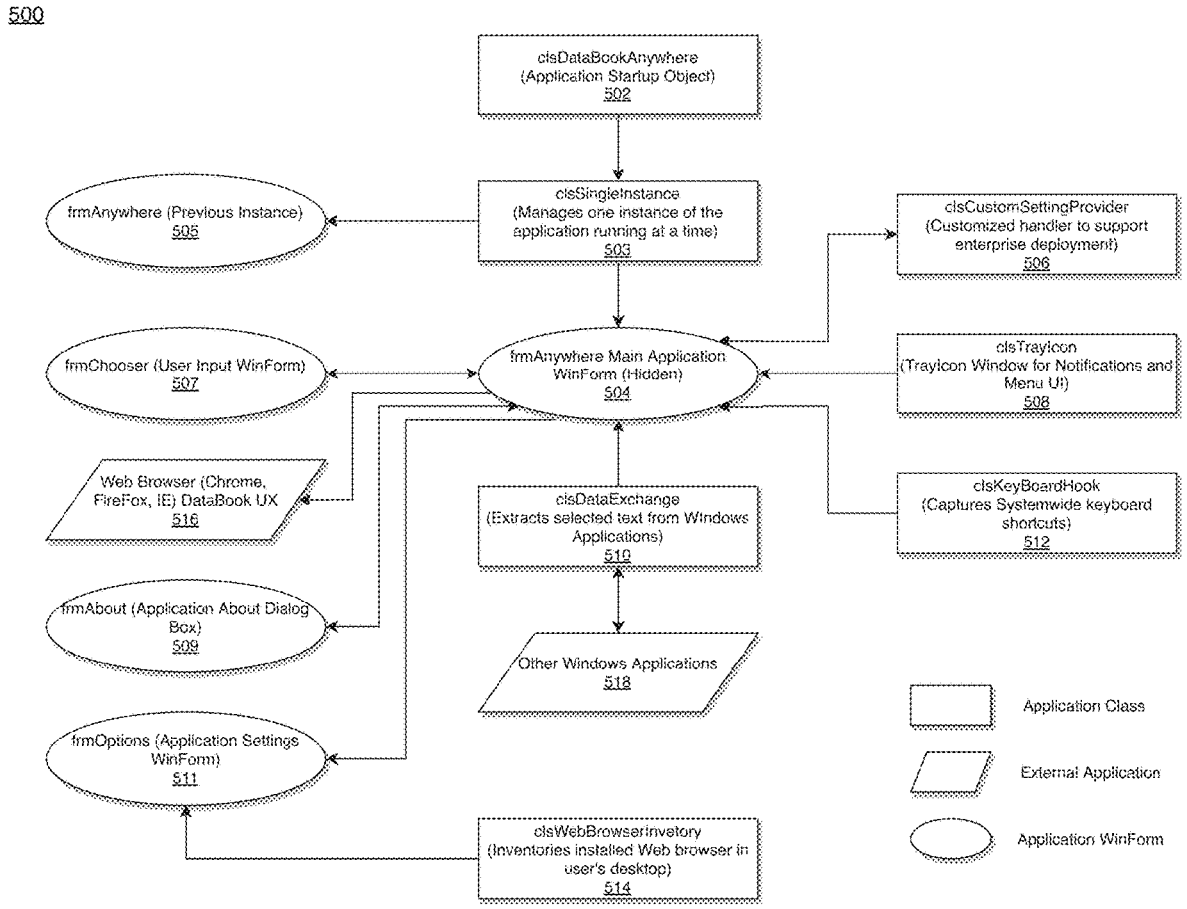
FIG. 5 illustrates an exemplary component architecture of a data book application in accordance with an exemplary embodiment.

FIG. 5 illustrates an exemplary component architecture 500 of a data book application in accordance with an exemplary embodiment. The component architecture 500 may include seven (7) application class components, but the disclosure is not limited thereto: cls data book anywhere component 502, cls single instance component 503, cls custom setting provider component 506, cls trayicon component 508, cls data exchange component 510, cls key board hook component 512, and cls web browser inventory component 514.

As illustrated in FIG. 5, the component architecture 500 may include two (2) external application components, but the disclosure is not limited thereto: web browser component 516 and other Windows applications component 518.

As illustrated in FIG. 5, the component architecture 500 may include five (5) application WinForm components, but the disclosure is not limited thereto: frmAnywhere Main Application component 504, frmAnywhere component 505, frmChooser component 507, frmAbout component 509, and frmOptions component 511.

According to exemplary embodiments, the cls data book anywhere component 502 may refer to application startup object, the cls single instance component 503 may manage one instance of the application running at a time, the cls custom setting provider component 506 may refer to customized handler to support enterprise deployment, the cls tray icon component 508 may refer to tray icon Window for notifications and menu user interface (UI), the cls data exchange component 510 may extract selected text from Windows applications, the cls key board hook component 512 may capture system-wide keyboard shortcuts, and the cls web browser inventory component 514 may refer to inventories installed web browser in user's desktop.

According to exemplary embodiments, the web browser component 516 may include Chrome, FireFox, Internet Explorer and data book UX.

According to exemplary embodiments, the frmAnywhere Main Application component 504 may be hidden and run in the background after log in, the frmAnywhere component 505 may refer to previous instance, the frmChooser component 507 may refer to user input WinForm, the frmAbout component 509 may refer to application about dialog, and the frmOptions component 511 may refer to application settings WinForm.

According to exemplary embodiments, the cls data book anywhere component 502 may be operatively connected to the cls single instance component 503. The cls single instance component 503 may be operatively connected to the frmAnywhere component 505 and the frmAnywhere main application WinForm component 504. According to exemplary embodiments, the frmAnywhere main application WinForm component 504 may also be operatively connected to the cls custom setting provider component 506, the cls tray icon component 508, the cls key board hook component 512, the cls data exchange component 510, the web browser component 516, the frmChooser component 507, the frmAbout component 509, and the frmOptions component 511.

According to exemplary embodiments, the other Windows Applications component 518 is operatively connected to the cls data exchange component 510. According to exemplary embodiments, the cls web browser inventory component is operatively connected to the frmOptions component 511.

According to exemplary embodiments, bi-directional communications are allowed between the following components: 1) between the frmAnywhere main application WinFrom component 504 and the frmChooser component 507; 2) between the frmAnywhere main application WinFrom component 504 and the cls custom setting provider component 506; 3) between frmAnywhere main application WinFrom component 504 and the frmAbout component 509; and 4) between the cls data exchange component 510 and the other windows applications component 518.

According to exemplary embodiments, the DBAM 406 may be configured to implement the component architecture 500 of FIG. 5 to utilize tools and packages in conjunction with open source code to read physical data, map the information, and assign business terminology as disclosed herein.

Figure 6A:
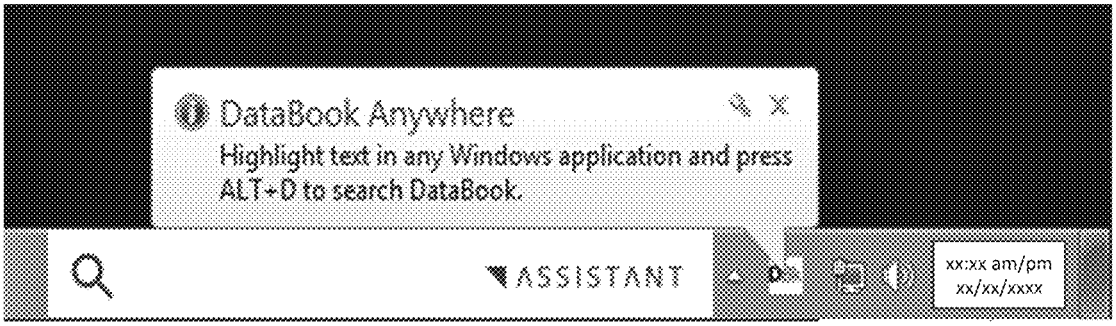
FIG. 6A illustrates a startup screenshot of a data book application in accordance with an exemplary embodiment.
Figure 6B:
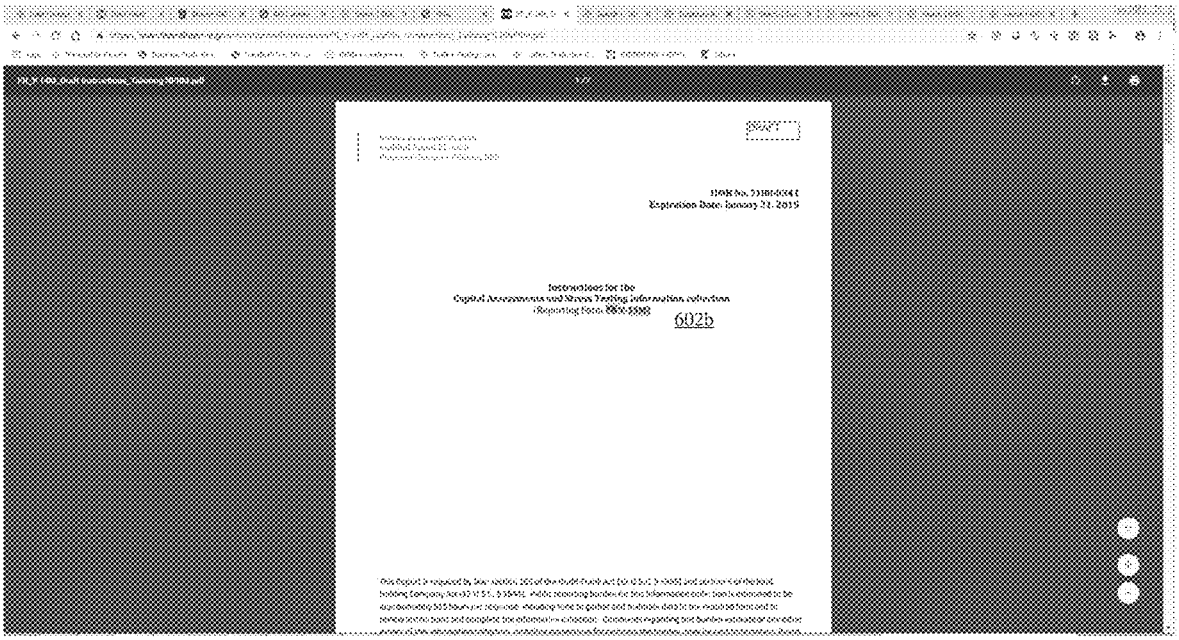
FIG. 6B illustrates a screen shot of a search window that utilizes the data book application in accordance with an exemplary embodiment.
Figure 6C:
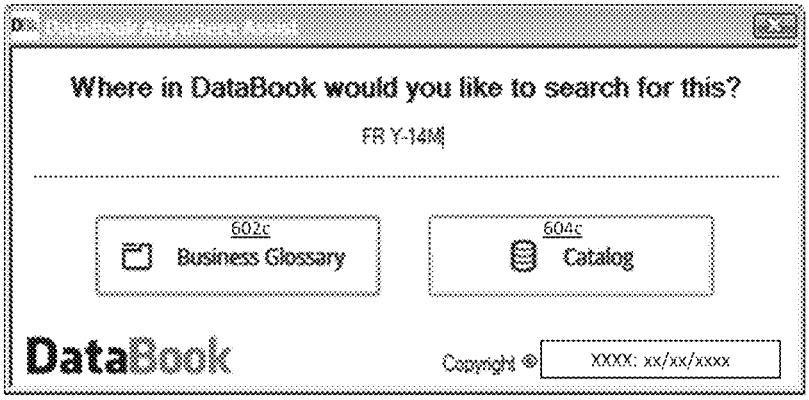
FIG. 6C illustrates a data book application assist screenshot in accordance with an exemplary embodiment.
Figure 6D:
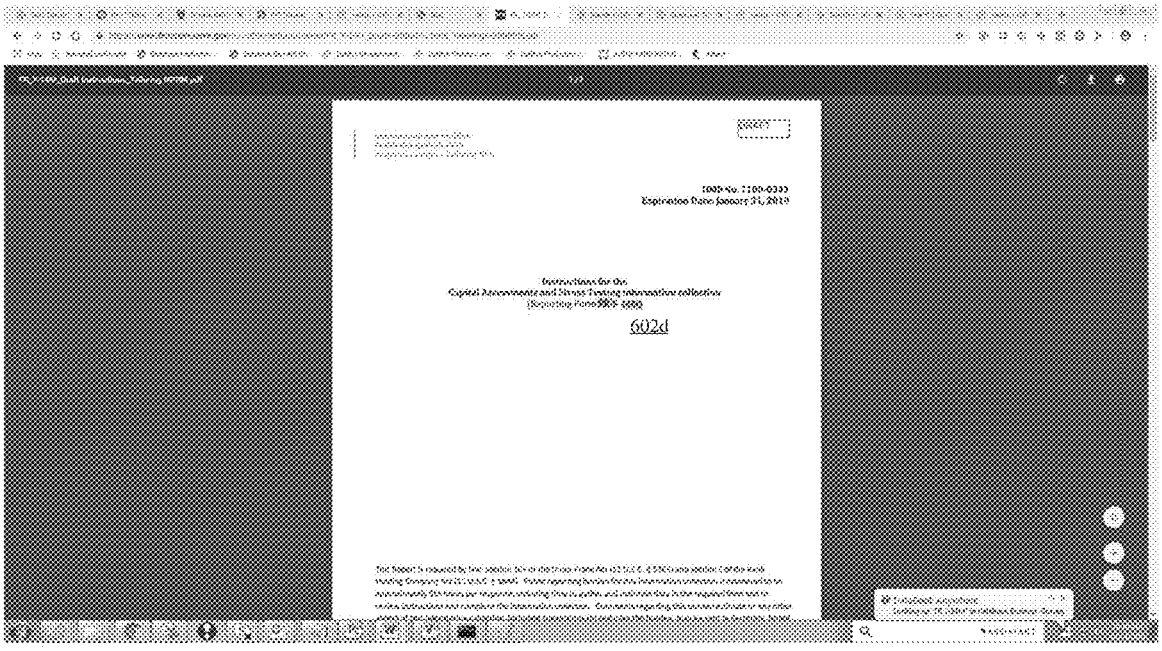
FIG. 6D illustrates a screen shot of a search window that utilizes the data book application to search within a business glossary in accordance with an exemplary embodiment.
Figure 6E:
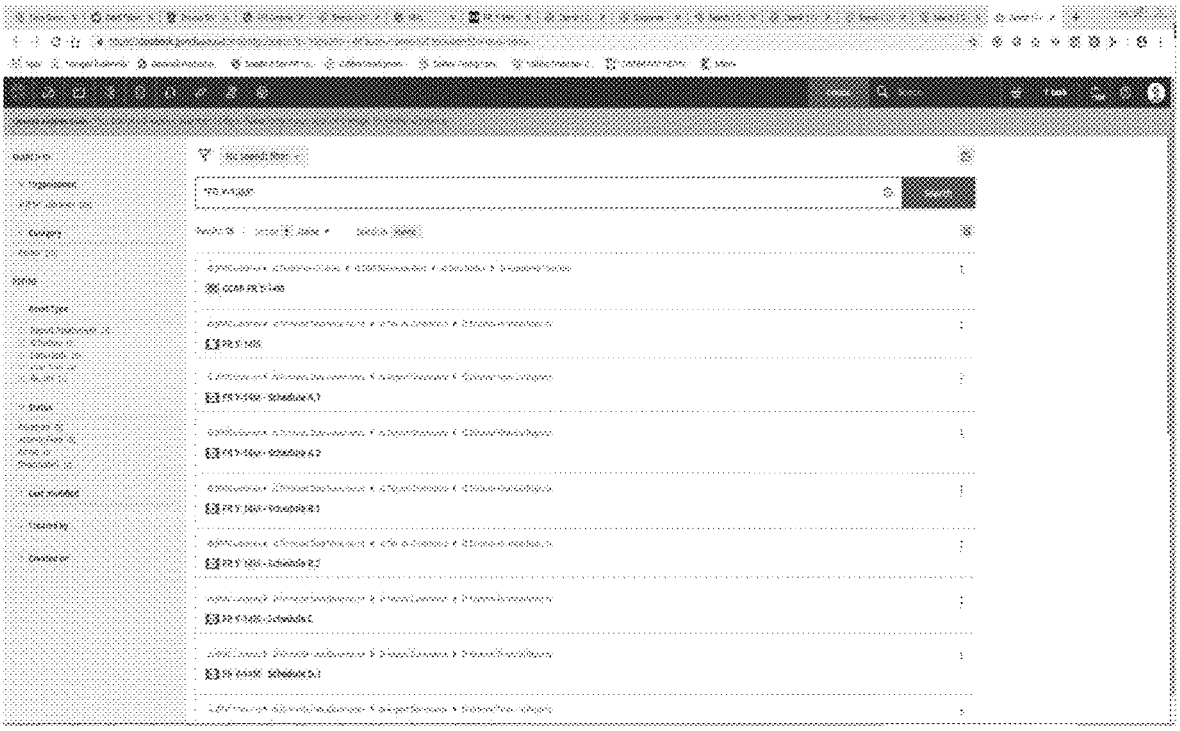
FIG. 6E illustrates a screenshot of a search result executed in FIG. 6D in accordance with an exemplary embodiment.
Figure 6F:
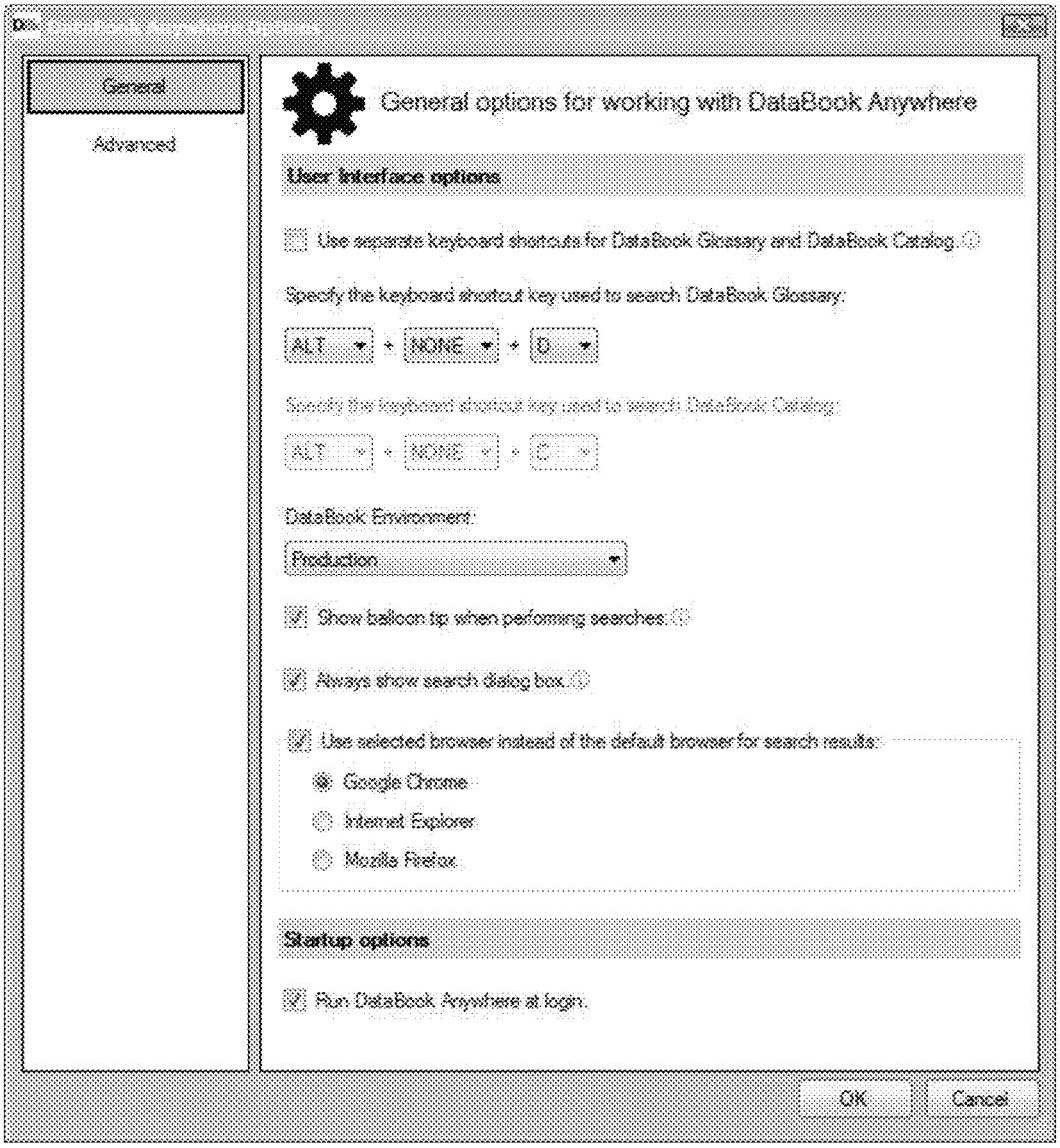
FIG. 6F illustrates a screenshot of general search options in accordance with an exemplary embodiment.
Figure 6G:
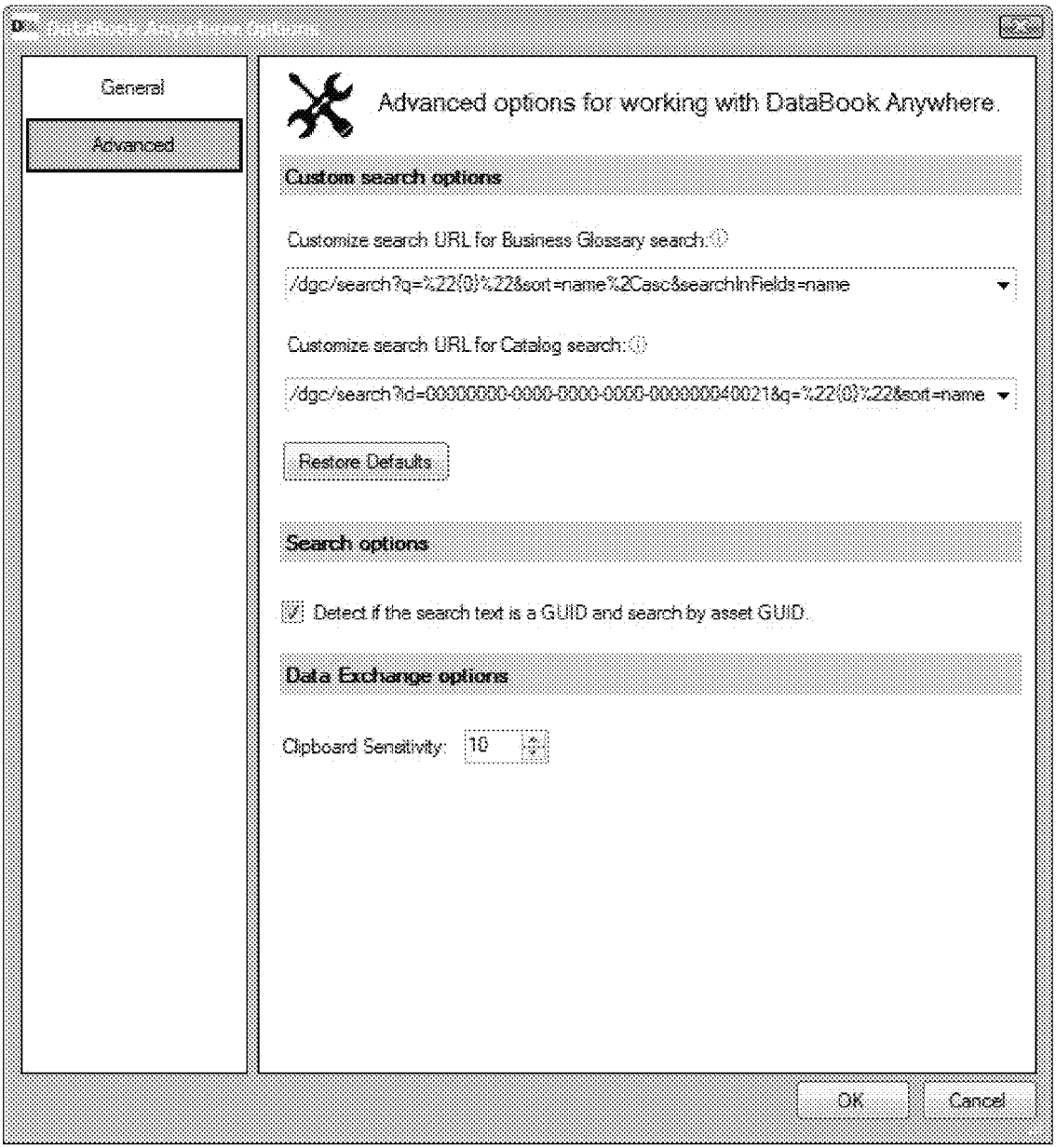
FIG. 6G illustrates a screenshot of advanced search options in accordance with an exemplary embodiment.

FIG. 6A illustrates a startup screenshot 600a of a data book application in accordance with an exemplary embodiment. FIG. 6B illustrates a screen shot 600b of a search window that utilizes the data book application in accordance with an exemplary embodiment. FIG. 6C illustrates a data book application assist screenshot 600c in accordance with an exemplary embodiment. FIG. 6D illustrates a screen shot 600d of a search window that utilizes the data book application to search within a business glossary in accordance with an exemplary embodiment. FIG. 6E illustrates a screenshot 600e of a search result executed in FIG. 6D in accordance with an exemplary embodiment. FIG. 6F illustrates a screenshot 600f of general search options in accordance with an exemplary embodiment. FIG. 6G illustrates a screenshot 600g of advanced search options in accordance with an exemplary embodiment.

According to exemplary embodiments, the receiving module 408 may be configured to receive a user input via a first icon of a user interface, the first icon corresponding to a glossary icon 602c (i.e., business glossary icon) that allows access to a glossary stored onto the servers and databases. According to exemplary embodiments, the glossary establishes common terminology across different applications and groups within an organization. According to exemplary embodiments, the scanning module 428 may be configured to execute a search 602d to scan the servers and databases for receiving inventories of columns, tables, and schema associated with the application from the glossary. A search result based on the glossary is illustrated in the screen shot 600e of FIG. 6E.

According to exemplary embodiments, the receiving module 408 may be configured to receive a user input via a second icon of a user interface, the second icon corresponding to a catalog icon 604c that allows access to a catalog stored onto the servers and databases. According to exemplary embodiments, the catalog may contain a listing of some or all applications within an organization identifying which lines of business use or be responsible for an application. The scanning module 428 may be configured to scan the servers and databases for receiving inventories of columns, tables, and schema associated with the application from the catalog.

According to exemplary embodiments, as illustrated in FIG. 6A, the DBAM 406 may be further configured to run the data book application at log in; and maintain running of the data book application in the background after log in.

According to exemplary embodiments, the DBAM 406 may be further configured run the data book application from any application on a Windows desktop. For example, Web Browsers may include, but not limited thereto, Internet Explorer, Chrome, FireFox, etc. (screen shot 600f of FIG. 6F). Windows applications may include, but not limited thereto, Adobe PDF Reader, Microsoft Office Suite, etc. Developments tools may include, but not limited thereto, IntelliJ IDEA and Microsoft Visual Studio, etc.

According to exemplary embodiments, as illustrated in FIG. 6C, the DBAM 406 may be further configured receive a single keystroke to provide a dialog box where a user can type and select a predefined type of search, but the disclosure is not limited thereto. For example, different keystrokes may be utilized to search either the glossary or the catalog.

According to exemplary embodiments, by utilizing the DBAM 406, a user may simply highlight any word in a Windows application then press ALT+G to execute search results.

According to exemplary embodiments, as illustrated in FIG. 6G, the application module 416 may be configured to apply a version 4 (V4) globally unique identifier (GUID) mechanism to assign an asset identifier (ID); and the scanning module 428 may be configured to scan the servers and databases for obtaining inventories of columns for that asset ID within the data factory.

According to exemplary embodiments, as illustrated in FIG. 6G, the application module 416 may be configured to receive a user input to change search uniform resource locator (URL) to perform target searches.

According to exemplary embodiments, by utilizing the DBAM 406, a data lineage query may be run against the data in a graph database. For example, the DBAM 406 may be configured to receive a query request of a certain data type using, for example, the GUI 432. In response to the query, applications that use or access that data, and the downstream data that is affected by the specified data, may be identified by the identification module 424.

According to exemplary embodiment, a traceability and/or lineage analysis of data may be performed by the DBAM 406. In one embodiment, a lineage may illustrate, for example, a flow of how data has moved, is moving, or will move and transform between systems, applications, tables, data domains, etc. A traceability view may be provided to illustrate the impact of the data on the different domains. For example, by issuing a SPARQL query, the lineage starting from a critical data element, to a logical data model attribute, to a reference data interface message field and to an application subscribing this message may be retrieved.

According to exemplary embodiments, if a data breach is identified by the identification module 424, an automated inventory of the breach (application, server, database, user(s), etc.) may be performed to determine what type of information (Personal Information (PI) or Intellectual Property (IP)) has been put at risk, allowing one or more protective actions to be taken, such as disconnecting a server; disconnecting a database; blacklisting an application; alerting the affected owners, systems, etc.; flagging data, applications, databases, etc.; quarantining data, applications, databases, etc.; generating reports, etc.

According to exemplary embodiments, a non-transitory computer readable medium may be configured to store instructions for implementing a data book application module is disclosed. According to exemplary embodiments, the instructions, when executed, may cause a processor embedded within the DBAM 406 or the DBAD 402 to perform the following: accessing a data factory that includes a data book application; identifying an application that needs to be scanned through the data factory utilizing the data book application; receiving inventories of all servers and databases associated with the data factory, scanning the servers and databases for receiving inventories of schema associated with the application, the schema containing tables and the tables containing columns; applying artificial intelligence and/or machine learning routines and matching algorithms for matching contents of columns to predefined logical terms; converting the contents of columns into taxonomies associated with the predefined logical terms; matching the taxonomies with the corresponding predefined logical terms; assigning a probability of accuracy value to the matched terms; populating a data catalog with the matched terms when the assigned probability of accuracy value satisfies a predetermined threshold value. The processor may be the same or similar to the processor 104 as illustrated in FIG. 1 or the processor embedded within DBAD 202, DBAD 302, DBAD 402, and DBAM 406.

Figure 7:
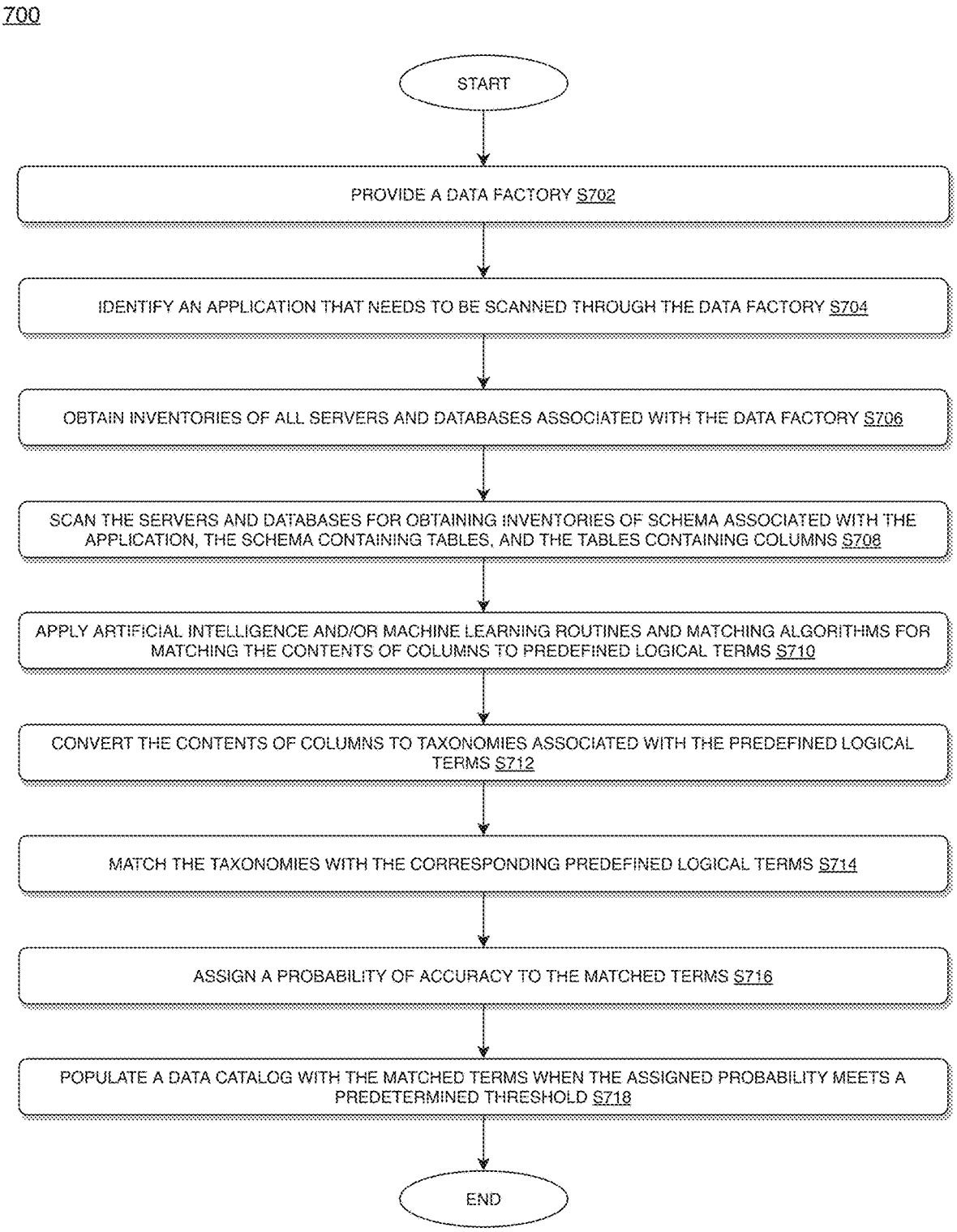
FIG. 7 illustrates a flow chart for implementing a data book application module in accordance with an exemplary embodiment.

FIG. 7 illustrates a flow chart for implementing a data book application module by utilizing one or more processors and one or more memories is disclosed.

In the process 700 of FIG. 7, at step S702, a data factory may be provided. The data factory may include a data book application.

At step S704, an application may be identified that needs to be scanned through the data factory utilizing the data book application.

At step S706, inventories of all servers and databases associated with the data factory may be obtained/received.

At step S708, the servers and databases may be scanned for receiving inventories of schema associated with the application. The schema may contain tables and the tables may contain columns.

At step S710, artificial intelligence and/or machine learning routines and matching algorithms may be implemented for matching contents of columns to predefined logical terms.

At step S712, the contents of columns may be converted into taxonomies (e.g., Englishify terms) associated with the predefined logical terms.

At step S714, the taxonomies may be matched with the corresponding predefined logical terms.

At step S716, a coefficient or probability of accuracy value may be assigned to the matched terms.

At step S718, a data catalog may be populated with the matched terms when the assigned coefficient value or the assigned probability of accuracy value satisfies a predetermined threshold value.

According to exemplary embodiments, the process 700 of FIG. 7 may further include: receiving a user input via a first icon of a user interface, the first icon corresponding to a glossary icon that allows access to a glossary stored onto the servers and databases, wherein the glossary establishes common terminology across different applications and groups within an organization; and executing a search to scan the servers and databases for receiving inventories of columns, tables, and schema associated with the application from the glossary.

According to exemplary embodiments, the process 700 of FIG. 7 may further include: receiving a user input via a second icon of a user interface, the second icon corresponding to a catalog icon that allows access to a catalog stored onto the servers and databases, the catalog containing a listing of some or all applications within an organization identifying which lines of business use or be responsible for an application; and scanning the servers and databases for receiving inventories of columns, tables, and schema associated with the application from the catalog.

According to exemplary embodiments, the process 700 of FIG. 7 may further include: running the data book application at log in; and maintaining to run the data book application in the background after log in.

According to exemplary embodiments, the process 700 of FIG. 7 may further include: running the data book application from any application on a Windows desktop.

According to exemplary embodiments, the process 700 of FIG. 7 may further include: receiving a single keystroke to provide a dialog box where a user can type and select a predefined type of search.

According to exemplary embodiments, the process 700 of FIG. 7 may further include: receiving a user input to select a desired web browser to view search results.

According to exemplary embodiments, the process 700 of FIG. 7 may further include: applying a version 4 (V4) globally unique identifier (GUID) mechanism to assign an asset identifier (ID); and scanning the servers and databases for obtaining inventories of columns for that asset ID within the data factory.

According to exemplary embodiments, the process 700 of FIG. 7 may further include: receiving a user input to change search uniform resource locator (URL) to perform target searches.

According to exemplary embodiments as disclosed above in FIGS. 1-7, technical improvements effected by the instant disclosure may include platforms for implementing a data book application module for data management, including data lineage, data usage, and data analysis, thereby gaining a high degree of confidence in the metadata recorded and automatically detecting and resolving data quality and data lineage issues in an efficient manner, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a data book application module by utilizing one or more processors and one or more memories, the method comprising:

providing a data factory that includes a data book application;

identifying an application that needs to be scanned through the data factory utilizing the data book application;

receiving inventories of all servers and databases associated with the data factory;

scanning the servers and databases for receiving inventories of schema associated with the application, the schema containing tables and the tables containing columns;

applying artificial intelligence and/or machine learning routines and matching algorithms for matching contents of columns to predefined logical terms;

converting the contents of columns into taxonomies associated with the predefined logical terms;

matching the taxonomies with the corresponding predefined logical terms;

assigning a probability of accuracy value to the matched terms; and populating a data catalog with the matched terms when the assigned probability of accuracy value satisfies a predetermined threshold value.

2. The method according to claim 1, further comprising:

receiving a user input via a first icon of a user interface, the first icon corresponding to a glossary icon that allows access to a glossary stored onto the servers and databases, wherein the glossary establishes common terminology across different applications and groups within an organization; and executing a search to scan the servers and databases for receiving inventories of columns, tables, and schema associated with the application from the glossary.

3. The method according to claim 1, further comprising:

receiving a user input via a second icon of a user interface, the second icon corresponding to a catalog icon that allows access to a catalog stored onto the servers and databases, the catalog containing a listing of some or all applications within an organization identifying which lines of business use or be responsible for an application; and scanning the servers and databases for receiving inventories of columns, tables, and schema associated with the application from the catalog.

4. The method according to claim 1, further comprising:

running the data book application at log in; and maintaining to run the data book application in the background after log in.

5. The method according to claim 1, further comprising:

running the data book application from any application on a Windows desktop.

6. The method according to claim 1, further comprising:

receiving a single keystroke to provide a dialog box where a user can type and select a predefined type of search.

7. The method according to claim 1, further comprising:

receiving a user input to select a desired web browser to view search results.

8. The method according to claim 1, further comprising:

applying a globally unique identifier (GUID) mechanism to assign an asset identifier (ID); and scanning the servers and databases for obtaining inventories of columns for that asset ID within the data factory.

9. The method according to claim 1, further comprising:

receiving a user input to change search uniform resource locator (URL) to perform target searches.

10. A system for implementing a data book application module, the system comprising:

a data factory that includes a data book application; and a processor coupled to the data factory via a communication network, wherein the processor is configured to:

identify an application that needs to be scanned through the data factory utilizing the data book application;

receive inventories of all servers and databases associated with the data factory;

scan the servers and databases for receiving inventories of schema associated with the application, the schema containing tables and the tables containing columns;

apply artificial intelligence and/or machine learning routines and matching algorithms for matching contents of columns to predefined logical terms;

convert the contents of columns into taxonomies associated with the predefined logical terms;

match the taxonomies with the corresponding predefined logical terms;

assign a probability of accuracy value to the matched terms; and populate a data catalog with the matched terms when the assigned probability of accuracy value satisfies a predetermined threshold value.

11. The system according to claim 10, wherein the processor is further configured to:

receive a user input via a first icon of a user interface, the first icon corresponding to a glossary icon that allows access to a glossary stored onto the servers and databases, wherein the glossary establishes common terminology across different applications and groups within an organization; and execute a search to scan the servers and databases for receiving inventories of columns, tables, and schema associated with the application from the glossary.

12. The system according to claim 10, wherein the processor is further configured to:

receive a user input via a second icon of a user interface, the second icon corresponding to a catalog icon that allows access to a catalog stored onto the servers and databases, the catalog containing a listing of some or all applications within an organization identifying which lines of business use or be responsible for an application; and scan the servers and databases for receiving inventories of columns, tables, and schema associated with the application from the catalog.

13. The system according to claim 10, wherein the processor is further configured to:

run the data book application at log in; and maintain running of the data book application in the background after log in.

14. The system according to claim 10, wherein the processor is further configured to:

run the data book application from any application on a Windows desktop.

15. The system according to claim 10, wherein the processor is further configured to:

receive a single keystroke to provide a dialog box where a user can type and select a predefined type of search.

16. The system according to claim 10, wherein the processor is further configured to:

apply a globally unique identifier (GUID) mechanism to assign an asset identifier (ID); and scan the servers and databases for obtaining inventories of columns for that asset ID within the data factory.

17. The system according to claim 10, wherein the processor is further configured to:

receive a user input to change search uniform resource locator (URL) to perform target searches.

18. A non-transitory computer readable medium configured to store instructions for implementing a data book application module, wherein, when executed, the instructions cause a processor to perform the following:

accessing a data factory that includes a data book application;

identifying an application that needs to be scanned through the data factory utilizing the data book application;

receiving inventories of all servers and databases associated with the data factory;

scanning the servers and databases for receiving inventories of schema associated with the application, the schema containing tables and the tables containing columns;

applying artificial intelligence and/or machine learning routines and matching algorithms for matching contents of columns to predefined logical terms;

converting the contents of columns into taxonomies associated with the predefined logical terms;

matching the taxonomies with the corresponding predefined logical terms;

assigning a probability of accuracy value to the matched terms;

populating a data catalog with the matched terms when the assigned probability of accuracy value satisfies a predetermined threshold value.

19. The non-transitory computer readable medium according to claim 18, wherein the instructions, when executed, further cause the processor to perform the following:

receiving a user input via a first icon of a user interface, the first icon corresponding to a glossary icon that allows access to a glossary stored onto the servers and databases, wherein the glossary establishes common terminology across different applications and groups within an organization; and executing a search to scan the servers and databases for receiving inventories of columns, tables, and schema associated with the application from the glossary.

20. The non-transitory computer readable medium according to claim 18, wherein the instructions, when executed, further cause the processor to perform the following:

receiving a user input via a second icon of a user interface, the second icon corresponding to a catalog icon that allows access to a catalog stored onto the servers and databases, the catalog containing a listing of some or all applications within an organization identifying which lines of business use or be responsible for an application; and scanning the servers and databases for receiving inventories of columns, tables, and schema associated with the application from the catalog.

* * * * *